United States Patent Office 3,709,927
Patented Jan. 9, 1973

---

3,709,927
METHOD FOR PREPARING METHACRYLIC ACID ESTER
Sango Kunichika and Yasumasa Sakakibara, Kyotofu, and Akio Noguchi, Konomu Kurisaki, Eizo Kato, and Mitsuru Uchiyama, Tokuyamashi, Japan, assignors to Idemitsu Kosan Co., Ltd., Tokyo, Japan
No Drawing. Filed Oct. 14, 1969, Ser. No. 866,376
Int. Cl. C07c 69/54, 69/56
U.S. Cl. 260—486 AC                6 Claims

ABSTRACT OF THE DISCLOSURE

A methacrylic acid ester is prepared by allowing a mixture of methylacetylene and allene to react with carbon monoxide and an alcohol such as methanol or ethanol at a temperature ranging from 100° C. to 200° C. using a catalyst comprising nickel carbonyl and an organic acid such as methacrylic acid or crotonic acid under a total pressure between 10 and 60 atmospheres.

---

This invention relates to a method for preparing a methacrylic acid ester from a mixture of methylacetylene and allene as starting materials.

It is reported that methylacetylene and allene are obtained by pyrolysis of propylene, but on the other hand, it is known that a considerable amount thereof is also contained in the pyrolysis products of naphtha. Further, it is reported as an example of an effective utilization of these two substances that, when either methylacetylene or allene is subjected to reaction with carbon monoxide and an alcohol in the presence of a nickel carbonyl catalyst, methacrylic acid ester can be obtained, but the yield is considerably lower in case of allene than in case of methylacetylene (The Bulletin of the Chemical Society of Japan 37, 1601; 40, 885; 41, 390; U.S. Pat. No. 2,871,262).

However, methylacetylene and allene are tautometrically convertible isomers, keeping a definite equilibrium relation at a high temperature, and accordingly, a mixture of these two substances is always obtained according to the said processes.

Separation of these two substances followed by isomerization of allene to methylacetylene does not only require more laborious operations, but is also accompanied with much more difficulties on the viewpoint of danger from a high explosivity of these two substances. In the present invention, the mixture of methylacetylene and allene is used to make methacrylic acid ester with a higher yield than the sum of the individual yields in case where the components of the mixture are reacted, respectively, and therefore the process of the present invention may be said to be a much more advantageous commercial process as compared with the conventional ones.

According to the present invention, a mixture of methylacetylene and allene is supplied to an alcohol containing nickel carbonyl and an organic acid in the atmosphere of carbon monoxide of a definite partial pressure at a high temperature under a high pressure to obtain a methacrylic ester according to the following reaction:

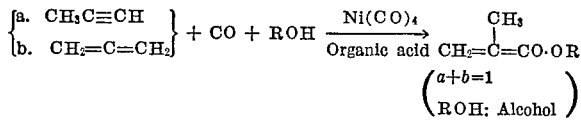

It is particularly effective in case where the ratio of methylacetylene to allene in the mixture is at least 1/3.

Further, a mixture of methylacetylene and allene, a starting material, can be diluted with an inert solvent such as a hydrocarbon selected from butane, butene, propane, propene, etc. or tetrahydrofuran, acetone on the viewpoint of explosion prevention.

The alcohol, one of the other starting materials in the present invention, may be selected from alcohols having one to five carbon atoms depending upon the desired methacrylic acid ester.

The catalyst employed in the present invention is nickel carbonyl and an organic acid. As for the organic acid, it is convenient to use methacrylic acid or crotonic acid. Hydrochloric acid which is used ordinarily is not suitable, because it often promotes undesirous polymerization of methylacetylene and allene and often forms methyl chloride under the reaction conditions of the present invention.

Even if water is added to the system instead of the organic acid as the catalyst, the above-mentioned organic acids are formed by this water in the reaction, and thus water may be used in place of the said organic acid.

It is desirable that the reaction temperature for carrying out the present invention is from 100° C. to 200° C. The rate of reaction is low at a temperature below 100° C. and the formation of such by-products as crotonic ester, etc., is increased at a temperature above 200° C.

The higher the carbon monoxide pressure is in effecting the present invention, the lower becomes the rate of reaction. On the other hand, when the carbon monoxide pressure becomes too low, nickel carbonyl undergoes decomposition. Therefore the preferable total reaction pressure is from 10 to 60 atmospheres.

In order to accomplish a high yield of methacrylic acid ester, it is more preferable to continuously supply the mixture of methylacetylene and allene to the reaction zone.

When the total amount of these starting materials are charged batchwise into the reaction system for the beginning, some side reactions take place.

The following examples will further illustrate this invention. All the percentages in the examples are expressed in terms of weight.

EXAMPLE 1

50 g. of methanol containing 0.1 g. of dissolved hydroquinone, 5 g. of methacrylic acid and 3.0 g. of nickel carbonyl were fed to a 500 cc. autoclave equipped with an electromagnetic stirrer under a stream of nitrogen and then carbon monoxide was introduced thereinto until the total pressure reached 10 atmospheres.

The autoclave was heated up to 160° C., and 20 g. of a mixture of 50% methylacetylene and 50% allene was continuously pumped into the autoclave for 150 minutes with stirring. Then, the stirring was continued for 30 minutes at 160° C. The carbon monoxide absorbed during the reaction was supplemented, whereby the total pressure was always maintained at 35 atmospheres.

After the completion of the reaction, the autoclave was cooled, and then nitrogen was passed at 50° C. to expel the unreacted materials, nickel carbonyl and other volatile substances. The reaction products were withdrawn from the autoclave and distilled, whereby methyl methacrylate and methyl crotonate were obtained in the yields of 78.4% and 4.6%, respectively.

By way of comparison, 20 g. of methylacetylene or 20 g. of allene was used alone and the reaction was conducted under quite the same reaction condition as described above.

As a result, methyl methacrylate and methyl crotonate were obtained in the yields of 85.2% and 8.6%, respectively by the use of methylacetylene alone as a starting material, while methyl methacrylate and methyl crotonate were obtained in yield of 46.3% and 4.7% respectively in case of allene.

The yield to be expected from the addition of the preceding data of two cases is 66% in case of the mixture of 50% methylacetylene and 50% allene as starting materials. Therefore, it is understood that the yield of methacrylate by the present invention is excellent as compared with the conventional method.

EXAMPLE 2

Another experiment was conducted in the same manner as in Example 1 except that 20 g. of a mixture of 30% methylacetylene and 70% allene was used and methyl methacrylate and methyl crotonate were obtained in the yields of 67.0% and 2.5%, respectively.

EXAMPLE 3

A further experiment was conducted in the same manner as in Example 1 except that 20 g. of a mixture of 80% methylacetylene and 20% allene was used, and methyl methacrylate and methyl crotonate were obtained in the yields of 81.8% and 7.2%, respectively.

EXAMPLE 4

A still further experiment was conducted in the same manner as in Example 1 except that 20 g. of a mixture of 95% methylacetylene and 5% allene was used and methyl methacrylate and methyl crotonate were obtained in the yields of 85.0% and 8.2%, respectively.

EXAMPLE 5

A still further experiment was conducted in the same manner as in Example 1 except that a mixture of 10 g. of methylacetylene, 10 g. of allene and 10 g. of tetrahydrofuran, was used and methyl methacrylate and methyl crotonate were obtained in the yields of 75.4% and 3.8%, respectively.

EXAMPLE 6

56 cc. of methanol containing 0.05 g. of hydroquinone, 4 cc. of water, 11 g. of methacrylic acid and 2.0 g. of nickel carbonyl were fed into a 100 cc. autoclave equipped with an electromagnetic stirrer under a stream of argon, and then the autoclave was sufficiently cooled with a Dry Ice-acetone mixture and was made vacuum. Then, 2.40 g. of a mixture of 61% methyl acetylene and 39% allene was added to the autoclave. Then, the temperature of the autoclave was reverted to the room temperature, and carbon monoxide was introduced until it reached 26 kg./cm.$^2$.

The mixture in the autoclave was stirred for three hours while being heated at 180° C. The carbon monoxide absorbed was continuously supplemented to keep the total pressure from 44 kg./cm.$^2$ to 46 kg./cm.$^2$ during the reaction.

After the completion of the reaction, the autoclave was cooled, and carbon monoxide was passed therethrough at 50° C. to expel the unreacted material, nickel carbonyl, and other volatile substances. It was found that the yields of methyl methacrylate and methyl crotonate were 65.0% and 4.0%, respectively.

By way of comparison, 2.40 g. of methylacetylene or 2.40 g. of allene was used alone, and the reaction was carried out under quite the same reaction conditions as described above.

As a result, the methyl methacrylate and methyl crotonate were obtained in the yields of 65.4% and 7.2%, respectively (on the basis of methylacetylene) by the use of methylacetylene alone as a starting material, while on the other hand, the methyl methacrylate yield was 47.2% (on the basis of allene), in case of allene used alone as a starting material. No methacrylic acid and methyl crotonate were formed. The methyl methacrylate yields to be expected from the addition of precedent data is 58.3% in case of 61% of methylacetylene and 39% of allene.

What is claimed is:

1. A method for producing a methacrylic acid ester which comprises reacting a mixture of methylacetylene and allene with carbon monoxide and an alcohol having 1 to 5 carbon atoms in the presence of nickel carbonyl and methacrylic acid or crotonic acid as catalyst.

2. A method according to claim 1, wherein the reaction is carried out at a temperature between 100° C. and 200° C.

3. A method according to claim 1, wherein the reaction is carried out under a total pressure between 10 and 60 atmospheres.

4. A method according to claim 1, wherein the mixing ratio of methylacetylene to allene is at least 1:3.

5. A method according to claim 1, wherein the mixture of methylacetylene and allene is diluted with an inert solvent.

6. A method according to claim 5, wherein the inert solvent is butane, butene, propane, propene, tetrahydrofuran, or acetone.

References Cited

FOREIGN PATENTS 1,110,565  4/1968  Great Britain ____ 260—480 AC

OTHER REFERENCES

Roberts and Caserio, Basic Principles of Organic Chemistry, W. A. Benjamin, Inc., 1965, New York, N.Y., p. 276.

LORRAINE A. WEINBERGER, Primary Examiner

P. J. KILLOS, Assistant Examiner

U.S. Cl. X.R.

260—526 N